(12) United States Patent
McGlinchy

(10) Patent No.: US 6,708,384 B2
(45) Date of Patent: *Mar. 23, 2004

(54) NOTCHED MUNTIN BARS HAVING TWO FINISHES

(75) Inventor: Timothy Bryan McGlinchy, Twinsburg, OH (US)

(73) Assignee: Glass Equipment Development, Inc., Twinsburg, OH (US)

(*) Notice: Subject to any disclaimer, the term of this patent is extended or adjusted under 35 U.S.C. 154(b) by 261 days.

This patent is subject to a terminal disclaimer.

(21) Appl. No.: 09/975,216

(22) Filed: Oct. 11, 2001

(65) Prior Publication Data

US 2002/0056183 A1 May 16, 2002

Related U.S. Application Data

(63) Continuation-in-part of application No. 09/781,630, filed on Feb. 12, 2001, which is a continuation-in-part of application No. 09/525,349, filed on Mar. 15, 2000, now Pat. No. 6,438,819, and a continuation-in-part of application No. 08/797,031, filed on Feb. 7, 1997, now Pat. No. 6,173,484.

(51) Int. Cl.$^7$ ................................................ B23P 17/00
(52) U.S. Cl. ..................... 29/417; 29/564.6; 29/564.7; 29/564.8; 29/33 P; 72/181
(58) Field of Search ................................ 29/564, 564.6, 29/564.7, 564.8, 33 P, 417, 469.5, 897.35, 700, 791, 792, 799, 709, 711, 897, 897.3, 897.31, 897.34, 412, 414, 714; 52/204.61, 664, 667, 668, 456, 656.5, 656.8; 72/178, 181

(56) References Cited

U.S. PATENT DOCUMENTS 3,748,814 A * 7/1973 Cribben ........................ 52/668

(List continued on next page.)

Primary Examiner—David P. Bryant
(74) Attorney, Agent, or Firm—Watts Hoffmann Co., L.P.A.

(57) ABSTRACT

An apparatus for making notched muntin bars. The apparatus includes an uncoiler or support for a supply of ribbon stock, a notching device, a roll forming machine and a severing device. The ribbon stock has a surface with first and second finishes. The notching device receives ribbon stock from the supply of ribbon stock. The notching device includes a punch that is moveable from a first position to a second position. In the first position the punch is activated to remove sections of material having the first finish. In the second position the punch is activated to remove sections of material having the second finish. The roll forming machine receives the ribbon stock from the notching device to form hollow muntin bar stock that has a first side with the first finish and a second side with the second finish. The formed muntin bar stock has notches in the first side having the first finish and notches in the second side having the second finish. The severing device severs the muntin bar stock to form individual muntin bars having the first and second finishes. The individual muntin bars may be assembled into a muntin bar grid having a first side with the first finish and second side with the second finish.

20 Claims, 6 Drawing Sheets

U.S. PATENT DOCUMENTS

| | | | |
|---|---|---|---|
| 4,060,950 A | * 12/1977 | Rackard et al. | 52/456 |
| 4,381,726 A | 5/1983 | Hojberg | |
| 4,455,850 A | * 6/1984 | Switten | 72/46 |
| 4,530,195 A | 7/1985 | Leopold | |
| 4,546,723 A | 10/1985 | Leopold et al. | |
| 4,628,582 A | 12/1986 | Leopold | |
| 4,989,384 A | * 2/1991 | Kinghorn et al. | 52/456 |
| 5,088,307 A | 2/1992 | Cole | |
| 5,105,591 A | 4/1992 | Leopold | |
| 5,165,208 A | 11/1992 | Lingemann | |
| 5,295,292 A | 3/1994 | Leopold | |
| 5,313,761 A | 5/1994 | Leopold | |
| 5,351,459 A | * 10/1994 | Kassl et al. | 52/656.5 |
| 5,361,476 A | 11/1994 | Leopold | |
| 5,574,651 A | 11/1996 | McKeegan et al. | |
| 5,678,377 A | 10/1997 | Leopold | |
| 6,173,484 B1 | 1/2001 | McGlinchy et al. | |
| 6,244,012 B1 | 6/2001 | McGlinchy et al. | |
| 6,397,453 B1 | * 6/2002 | McGlinchy et al. | 29/564.6 |
| 6,425,221 B1 | * 7/2002 | Reichert | 52/456 |
| 6,438,819 B1 | * 8/2002 | McGlinchy et al. | 29/564.6 |
| 2002/0102370 A1 | * 8/2002 | Glover et al. | 428/34 |
| 2002/0108228 A1 | * 8/2002 | McGlinchy et al. | 29/417 |
| 2002/0138964 A1 | * 10/2002 | McGlinchy | 29/469.5 |

\* cited by examiner

NOTCHED MUNTIN BARS HAVING TWO FINISHES

CROSS REFERENCE TO RELATED APPLICATIONS

The present application is a continuation in part of U.S. patent application Ser. No. 09/525,349 entitled "System for Fabricating Contour Muntin Bars from Sheet Material" filed on Mar. 15, 2000, now U.S. Pat. No. 6,438,819, which is a continuation in part of U.S. patent application Ser. No. 08/797,031 entitled "System for Fabricating Muntin Bars from Sheet Material," filed on Feb. 7, 1997, now U.S. Pat. No. 6,173,484, and is also a continuation in part of U.S. patent application Ser. No. 09/781,630, entitled "Laminated Muntin Bar and Apparatus" filed on Feb. 12, 2001, currently pending. The disclosure of these co-pending applications are incorporated herein by reference.

FIELD OF THE INVENTION

The present invention concerns muntin bars used for separating window panes of large size into smaller size panes to enhance the appearance of a window.

BACKGROUND ART

Windows constructed from multiple glass panes utilized "muntins" or "muntin bars" to secure the edges of the individual glass panes within the window sash. In many windows, muntins formed distinctive grid patterns that are associated with architectural styles of buildings containing the windows.

Modern windows formed by insulating glass units utilize single glass lites separated by an insulating dead air space. Where a particular architectural "look" is desired, a grid of muntin bars is fixed in the dead air space between the glass lites to simulate a multi-pane window. Typical muntin bars for insulating glass units are formed from decoratively coated interfitted metal tubes. The grids are anchored to the insulating glass unit periphery.

Constructing muntin bar grids for insulating glass units has been a labor intensive process. As a consequence, manufacturing such units, and thus windows formed by the units, has been costly and inefficient. Some efforts to mechanize the manufacture of muntin grids have been made. Commonly owned U.S. Pat. No. 6,173,484 entitled "System for Fabricating Muntin Bars from Sheet Material" which issued Jan. 16, 2001 to McGlinchy et al. is an example of a system for automated fabrication of muntin bars. The subject matter of this patent is incorporated herein by reference. Commonly owned pending U.S. patent application Ser. No. 09/525,349 entitled "System for Fabricating Contour Muntin Bars from Sheet Material" is a second patent application to McGlinchy et al concerning automated fabrication of so-called contour muntin bars and the subject matter of this application is incorporated herein by reference.

The muntin bar stock is produced by roll forming decoratively coated sheet material such as aluminum or steel, in a known manner. Various sizes of the sheet material are used to form different size muntin bar stock. The roll forming machine has a series of rolls configured to form sheet material into elongated tubular muntin bar stock. A window manufacturer purchases the muntin bar stock size(s) needed to produce insulating glass units. Apparatus disclosed in the aforementioned patent application also cuts the stock into lengths that are notched in appropriate locations for assembly into grids for incorporation into the insulating glass units.

The residential window and door industry has witnessed an increased demand for internal decorative muntin bars contained in insulated glass units (IGUs) of their windows. This market demand for muntin bars has increased due to popular "colonial look" trends in the market. Also contributing to the demand are new construction and residential building codes requiring a common facade in local neighborhoods. With people also desiring differentiation and designer choices in their windows, a demand for so-called "two tone" muntin bars is on the rise. The two tone muntin bar assembly presents one appearance from the outside and a second appearance from inside the window.

Two-tone muntin bars are offered today in many color combinations for both rectangular and contour style muntin bars. A two-tone muntin bar demands a premium price in the market place. One reason for the increased price of two tone muntin bars is the fact that automated manufacturing of two tone muntin bars using controlled notching, roll forming and severing has not occurred.

The most common method practiced at the present time for manufacturing two tone muntin grids starts with a long roll formed bar that is often shipped to a secondary supplier that paints or laminates the bar with a solid color tone or wood pattern on one side and a second color or wood pattern on the opposite side. Use of multiple steps performed by multiple suppliers results in significant additional cost to the product. More elaborate bars have simulated wood grains that are used to match up with the wood trim in or surrounding the window sash. All of the current methods require cutting specified length segments from a two tone bar. This bar is then mitered and/or punched to complete fabrication of the muntin bar. The current methods require post painting and/or lamination of the formed muntin bar which is time consuming, costly and constrained throughput in a production environment. The current process also leads to a build up of material inventory to give the suppliers adequate lead time for performing these post roll forming procedures.

SUMMARY OF THE INVENTION

The present invention concerns an automated method and apparatus for producing notched muntin bars from a supply of sheet material having first and second finishes. In accordance with one process muntin bars having first and second finishes are provided that have one appearance when viewed from outside the window and a second appearance when viewed from inside the window.

In an exemplary embodiment of the invention a supply of thin sheet material that has been treated to define first and second finishes on one side of the sheet material is provided. Sections of the material having the first finish and sections of the material having the second finish are removed from the sheet material. The sheet material is then formed into an elongated tubular muntin bar stock. The muntin bar stock has a first side having the first finish and a second side having the second finish. The muntin bar stock has notches in the first side that correspond to the removed sections of material having the first finish. The formed muntin bar stock has notches in its second side that correspond to the removed sections of material having the second finish. The muntin bar stock is severed at predetermined locations to form individual notched muntin bars. The notches in the individual muntin bars are located along the length of the muntin bars to allow the individual muntin bars to be combined to form a muntin bar grid having a first side with the first finish and a second side with the second finish.

One aspect of the invention is used to make a first set of muntin bars that will be assembled in a first orientation.

Each of the muntin bars in the first set of muntin bars includes notches only in the side having the first finish. Each muntin bar in a second set of muntin bars that will be assembled in a second orientation includes notches only in the side having the second finish. By notching the muntin bars that will be assembled in the first orientation only on one side and notching the muntin bars that will be assembled in the second orientation on the opposite side, a muntin bar grid having first and second finishes on opposing sides is easily assembled.

An apparatus for making notched muntin bars having sides with first and second finishes includes a ribbon stock support or uncoiler, a notching device, a roll forming machine and a severing device. The uncoiler supplies the ribbon stock having one surface with first and second finishes. The notching device receives the ribbon stock from the supply of ribbon stock. The notching device has a punch that is movable between a first position where the punch is engageable with ribbon stock having the first finish and a second position where the punch is engageable with ribbon stock having the second finish. The roll forming machine receives ribbon stock from the notching device to form hollow muntin bar stock that has a first side with the first finish and a second side with the second finish. The formed muntin bar stock has notches in one side that correspond to removed sections of material having the first finish and notches in the second side that correspond to removed sections of material having the second finish. The severing device severs the formed muntin bar stock to form individual notched muntin bars having sides with first and second finishes.

In the exemplary embodiment, the notching device includes a pneumatic cylinder that moves the punch between the first and second positions. A control is coupled to the pneumatic cylinder which causes the cylinder to move the punch to the first position when stock corresponding to a muntin bar that will be assembled in a muntin bar grid in a first orientation is being punched. The control causes the cylinder to move the punch to the second position when the stock corresponding to a muntin bar to be assembled in a muntin bar grid in a second orientation is being punched.

These and other objects, advantages and features of the invention will become better understood from a review of the exemplary embodiment of the invention which is described in conjunction with the accompanying drawings.

BEST MODE FOR CARRYING OUT THE INVENTION

Figure 1:
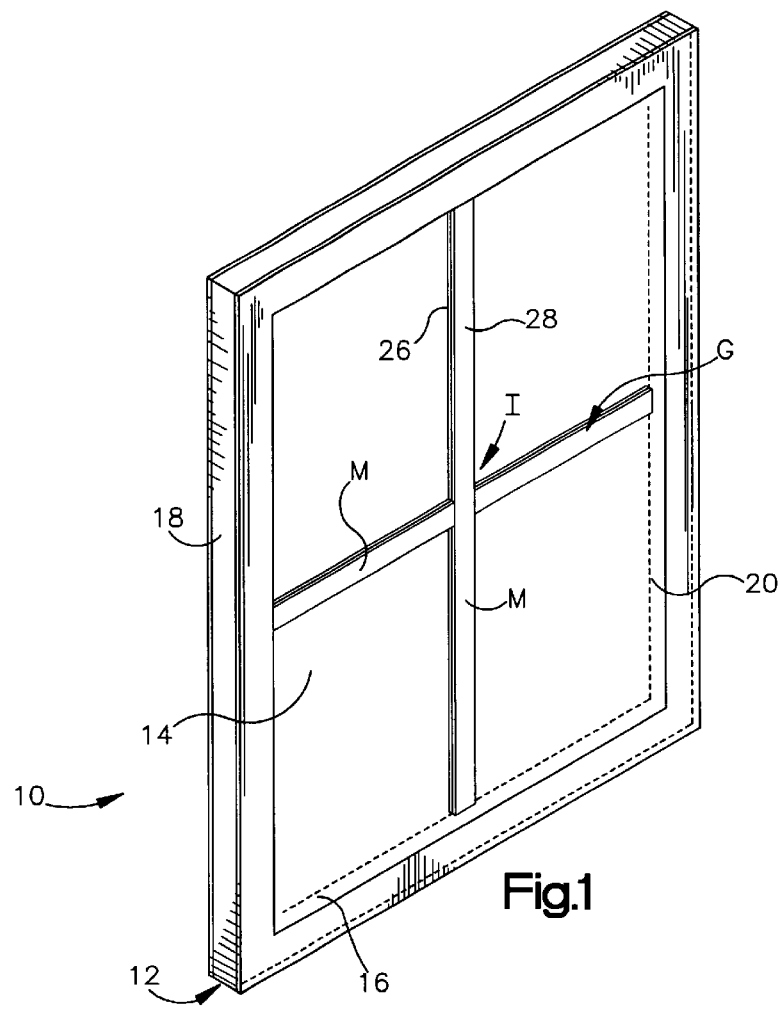
FIG. 1 is a perspective view of an insulating glass unit including a muntin bar grid.

FIG. 1 shows an insulating glass unit indicated generally by the reference numeral 10. The insulating glass unit 10 comprises a spacer assembly 12 sandwiched between glass sheets, or lites 14. The spacer assembly 12 includes a frame assembly 16 hermetically joined to the glass lites by a sealant 18 to form a closed dead air space 20 between the glass lites. The insulating glass unit 10 illustrated in FIG. 1 is in condition for assembly to a window or door frame (not shown).

Figure 2:
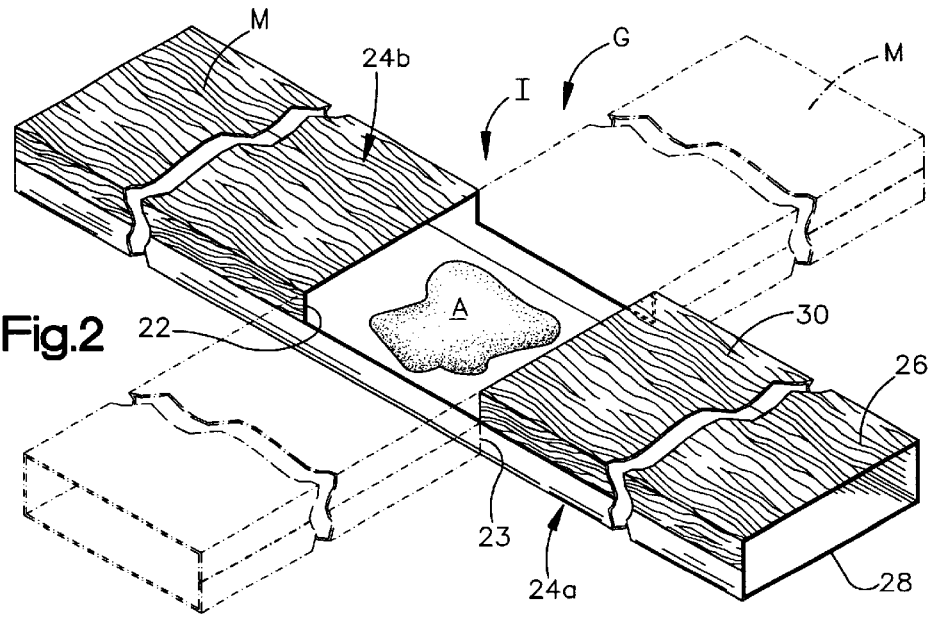
FIG. 2 is an enlarged perspective view of a portion of a muntin bar grid of the insulating glass unit of FIG. 1.

A muntin bar grid G is disposed between the glass lites to provide the unit 10 with the appearance of a multi-pane window. As seen in FIG. 2, the illustrated grid G is comprised of muntin bars M having notches 22, 23 interfitted at an intersection I. In certain instances, the muntin bars M are secured together by a suitable adhesive A. A more common technique used to secure two muntin bars together utilizes a flexible cross-shaped clip that extends a short distance into each of the two intersecting muntin bars M.

Figure 8:
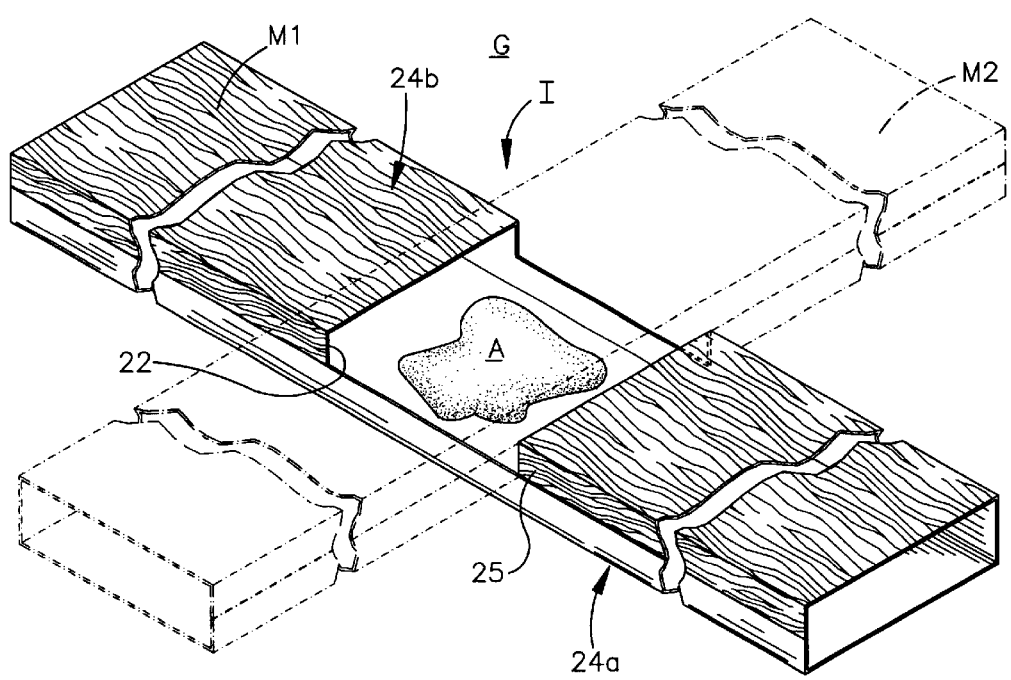
FIG. 8 is an enlarged perspective view of a portion of a muntin bar grid.

In an alternate embodiment, illustrated by FIG. 8, the grid G is comprised of a notched muntin bar M1 and an unnotched muntin bar M2 interfitted at an intersection I. In the embodiment illustated by FIG. 8, the notched muntin bar M1 is offset from the unnotched muntin bar M2. The offset occurs, because the unnotched muntin bar is thicker than the notch 22 in the notched muntin muntin bar M1. The muntin bars M1 and M2 are secured together by a suitable adhesive A in the illustrated embodiment.

In another embodiment, a section of the sidewalls 25 corresponding to the notch 22 is completely removed is to minimize the offset. In this embodiment, the muntin bars M1, M2 are offset by the thickness of the material used to form the muntin bar and the thickness of the glue used to hold the muntin bars together.

The muntin bar grid G depicted in FIG. 8 can be constructed with the apparatus disclosed by U.S. Pat. No. 6,173,484 to McGlinchy et al. The '484 patent discloses a system for fabricating notched muntin bars from sheet material. Referring to FIG. 8, the notched muntin bar M1 may be constructed using stock material S having first and second finishes 26, 28 in the apparatus disclosed by the '484 patent. The unnotched muntin bars may be constructed with the apparatus disclosed by the '484 patent by selectively disabling the first forming station (notching station).

Figure 3:
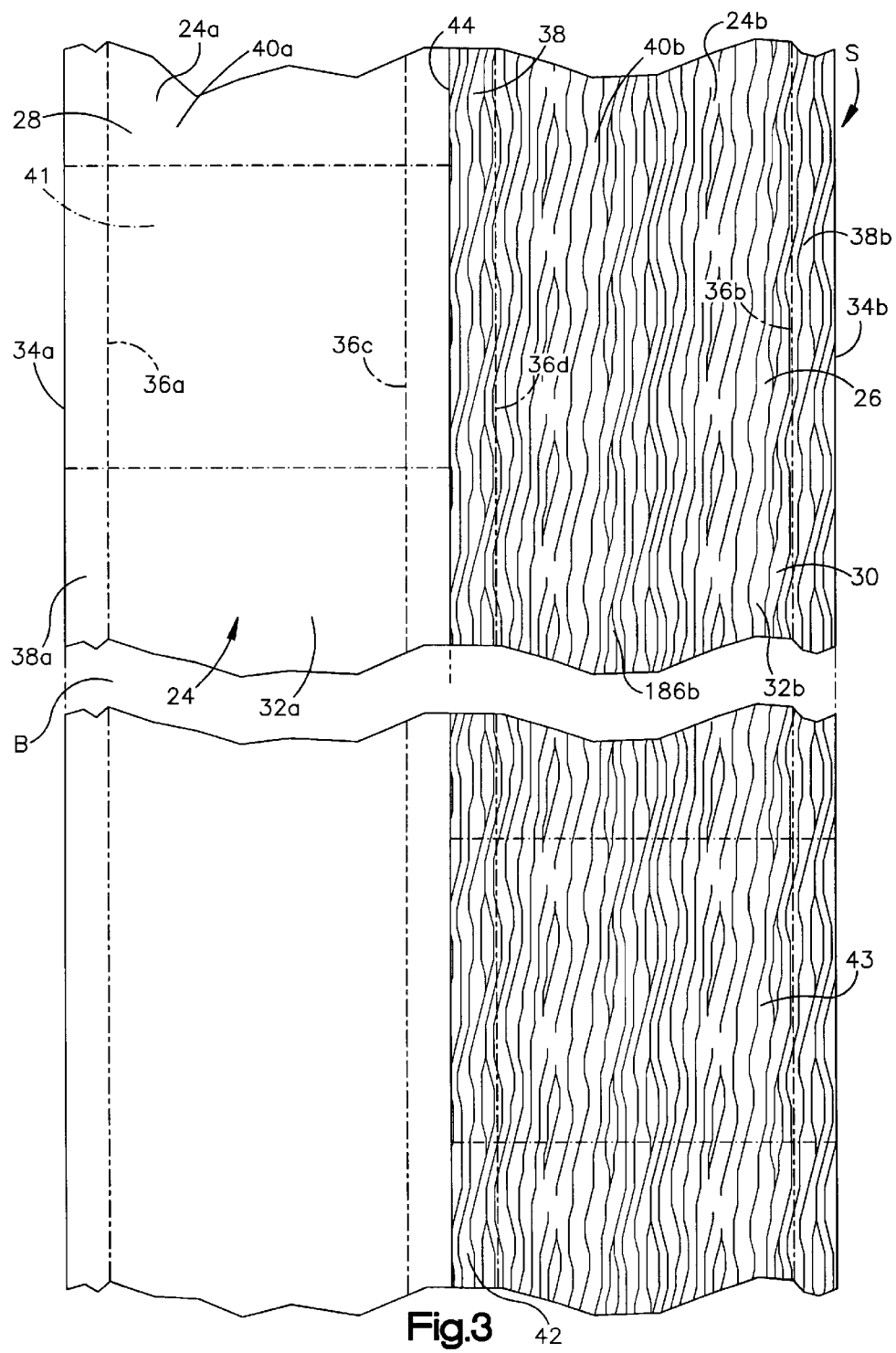
FIG. 3 is a plan view of a portion of stock material partially processed according to the invention.

FIG. 3 shows a stock material S that is to be formed into a muntin bar M according to the invention. In the exemplary embodiment, an outer surface 24 of the stock material S includes first and second finishes 26, 28. The first finish 26 is the finish presented to an observer from one side of the completed insulating glass unit 10 and the second finish is the finish presented to an observer from the opposite side of the insulating glass unit. Although any combination of finishes may be used, in the exemplary embodiment the finish 26 is a woodgrain finish and the finish 28 is a single color painted finish.

The stock material S is made from a thin elongated metal, for example, aluminum or steel that can be wound into an elongated strip as disclosed in pending patent application Ser. No. 09/525,349, entitled "System for Fabricating Contour Muntin Bars From Sheet Material," filed on Mar. 15, 2000 and U.S. Pat. No. 6,173,484 to McGlinchy. In one embodiment, the first and second finishes 26, 28 are painted onto the outer surface 24 of the stock material S. In a second embodiment, the outer surface 24 is painted a desired color that corresponds with the second finish 28. In this second embodiment, the first finish 26 is achieved by applying a coating or covering layer 30 (FIG. 3) to one side 32b of the outer surface 24 of the stock material S leaving a painted finish on the other side 32a uncovered. The details of the process for applying the coating 30 are described in detail in U.S. patent application Ser. No. 09/781,630, entitled "Laminated Muntin Bar and Apparatus," filed on Feb. 12, 2001.

In the exemplary embodiment, the ribbon stock S is fed lengthwise through a muntin bar production line that includes a series of forming stations that form the ribbon stock into first and second sets of muntin bars. Although it should be readily apparent that any combination of finishes could be used, the illustrated muntin bars have a painted side 24a and a woodgrain finished side 24b. Referring to FIG. 2, the first set of muntin bars each have one or more notches 22 in the woodgrain side 24b having the finish 26. The second set of muntin bars each have one or more notches 23 in the painted but unlaminated side 24a. Each of the muntin bars with a notch 22 in the first side 24a interfit with a muntin bar with a notch 23 in the second side 24b as depicted in FIG. 2.

Figure 4:
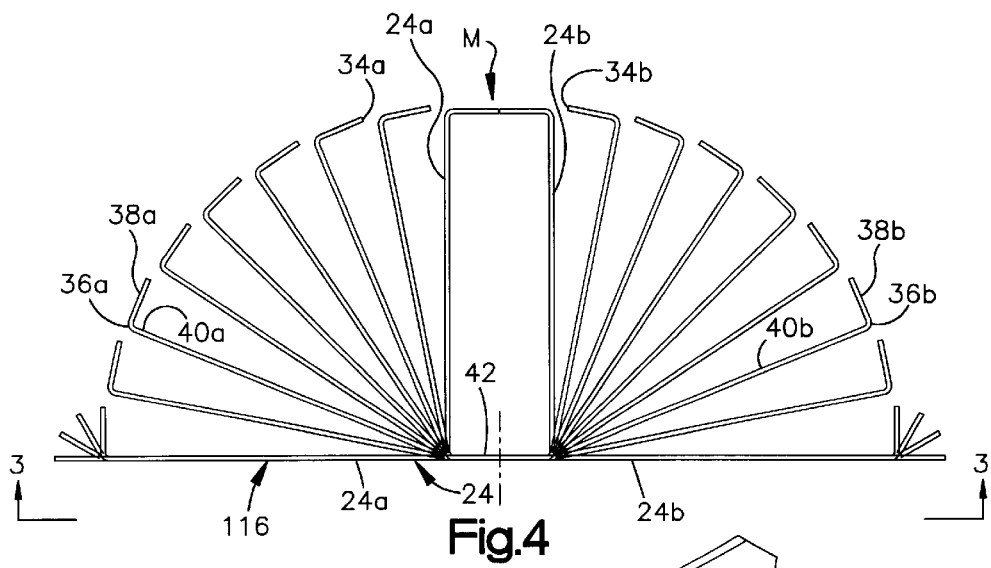
FIG. 4 is an elevational view schematically illustrating forming the stock material of FIG. 3 into a muntin bar.

Referring to FIGS. 3 and 4, the stock material S includes opposite edges 34a, 34b that, along with fold lines 36a, 36b define a pair of end panels 38a, 38b. The fold lines 36a, 36b, along with fold lines 36c, 36d, define a pair of intermediate panels 40a, 40b. The fold lines 36c, 36d define a central panel 42. A cutout 41, shown in phantom, extends inward from edge 34a of the stock material S illustrated in FIG. 3 to a centerline 44. In the illustrated embodiment, a second cutout 43, shown in phantom, extends inward from edge 34b to the centerline. In the exemplary embodiment, the cutout 41 corresponds to a notch 23 in the painted but unlaminated side of one muntin bar and the cutout 43 corresponds to a notch 22 in the woodgrain side 24b of a second muntin bar. The break B illustrates that there is typically a distance between the cut-out 41 and the cutout 43.

In the exemplary embodiment, one half of the stock material S, extending from the centerline 44 to the edge 34b has the finish 26. The remaining half of the stock material S, extending from the centerline 44 to the edge 34a has the finish 28. The first and second finishes 26, 28 produce a different muntin bar appearance on opposite sides of the insulating glass unit 10. To facilitate construction of the muntin bar grid G having difference appearances on opposite sides, the stock S is punched to form muntin bars that will be positioned in a first orientation with notches 22 in the side 24b with the finish 26 (woodgrain in the illustrated embodiment) and muntin bars that will be positioned in a second orientation with notches 23 in the side 24a with the finish 28 (painted in the illustrated embodiment).

Figure 6:
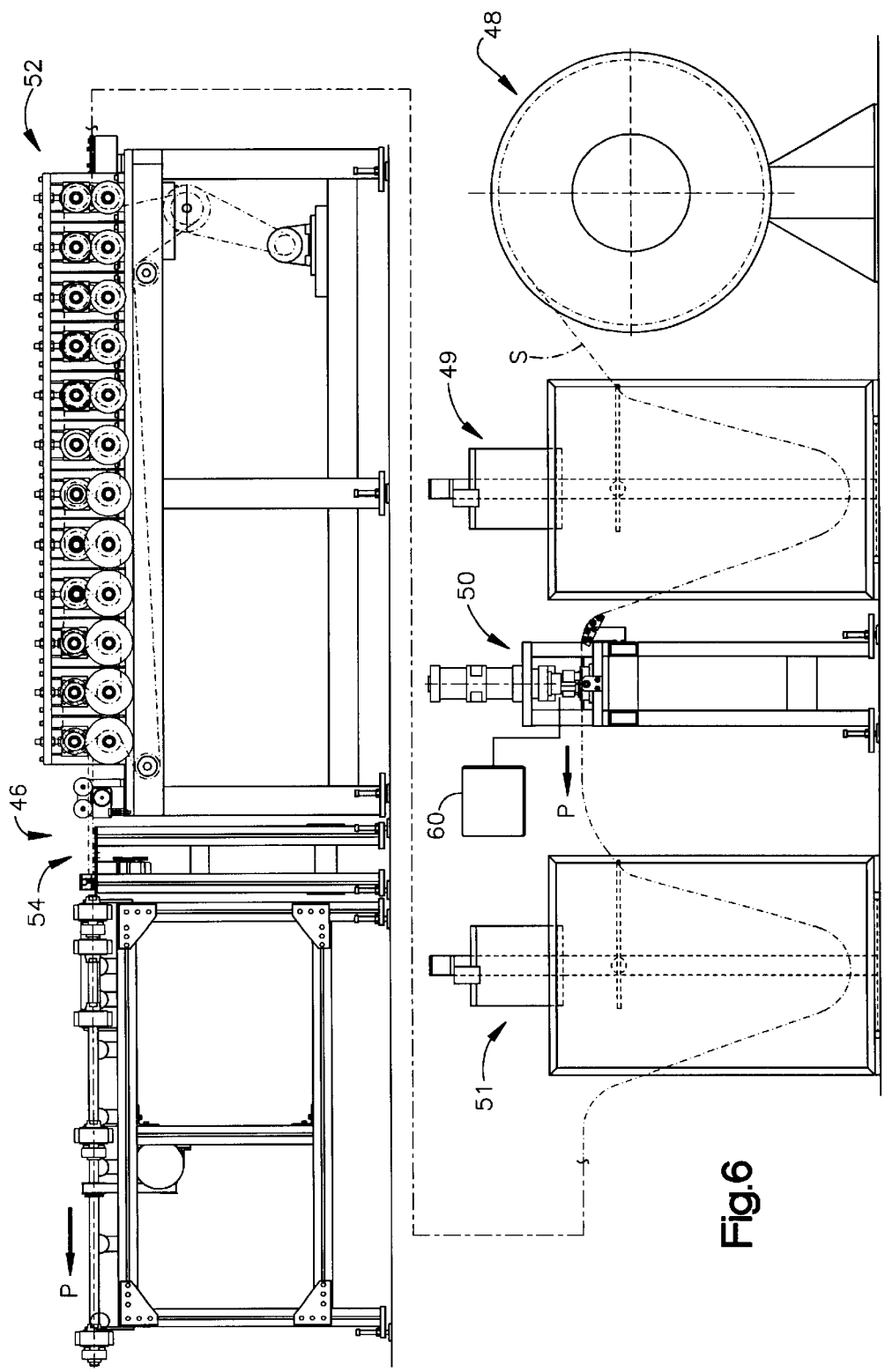
FIG. 6 is a front elevational view of an apparatus for forming notched muntin bars having two finishes; and, FIG. 7 is a perspective view of a notching device for notching ribbon stock having two finishes.

FIG. 6 illustrates an apparatus 46 for making sets of notched muntin bars M. The illustrated apparatus 46 includes an uncoiler 48 or support for the supply of ribbon stock S, a first accumulator 49, a notching device 50, a second accumulator 51, a roll forming machine 52, and a severing device 54.

Figure 7:
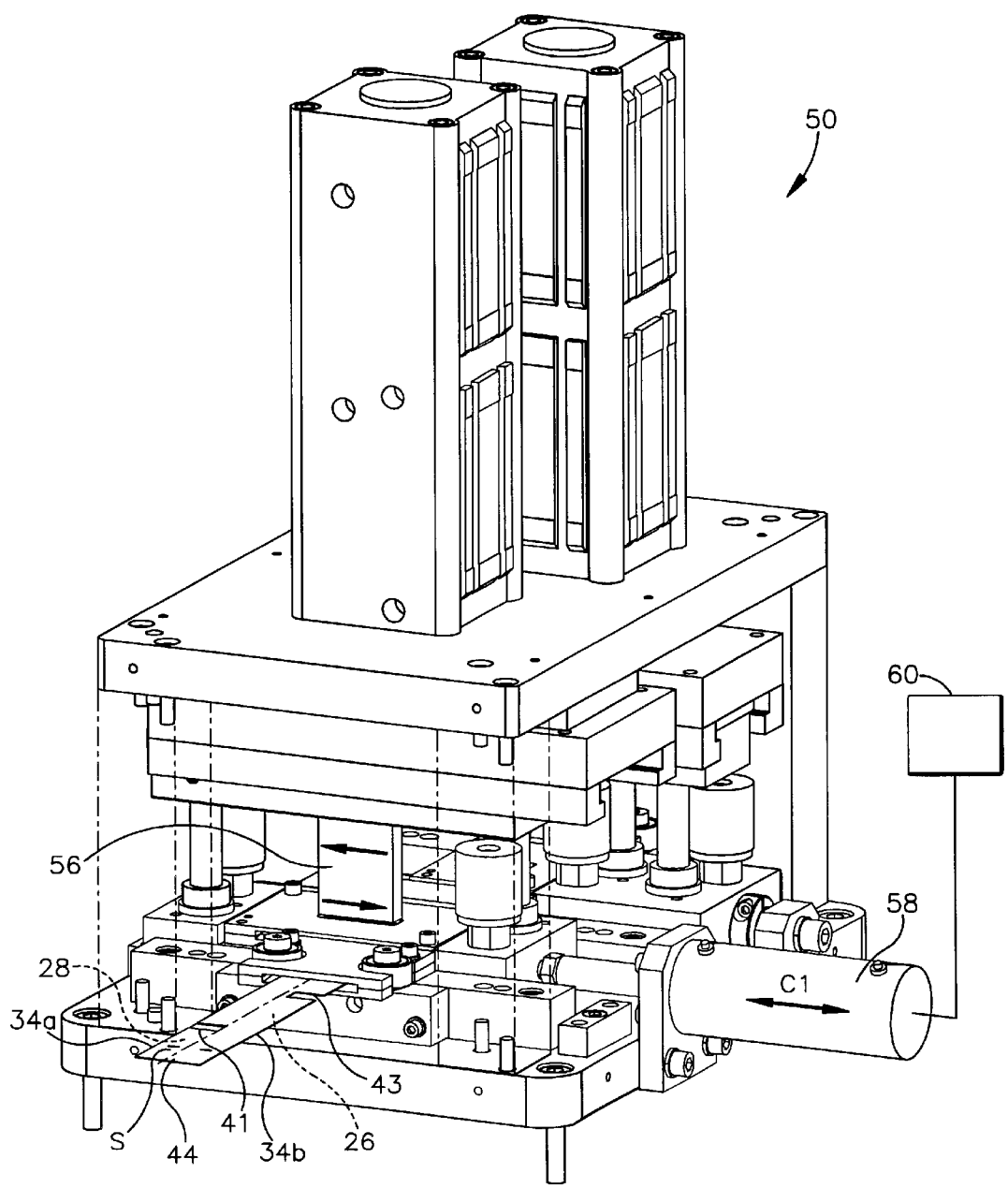

The notching device 50 receives the ribbon stock S from the ribbon stock uncoiler 48 by way of the first accumulator 49. Referring to FIG. 7, the notching device 50 includes a punch 56 that is movable between a first position where the punch is engageable with a portion of the stock S having the finish 26 and a second position where the punch is engageable with a portion of the stock S having the finish 28. When the punch 56 is actuated it moves down and cuts through the ribbon stock S that intersects the punch to form cut-outs. After a cut-out is punched, the punch 56 is moved up and the stock S is advanced. In the exemplary embodiment, when the punch 56 is actuated in the first position, material is removed from the stock S to form a cutout 43 that extends from the edge 34b, to the centerline 44. When the punch 56 is actuated in the second position, material is removed from the stock S to form a cutout 41 that extends from the edge 34a to the centerline 44.

In the exemplary embodiment, the notching device 50 includes a pneumatic cylinder 58 that moves the punch 56 between the first and second positions. The pneumatic cylinder 58 is connected to a control 60 that causes the cylinder 58 to move the punch 56 to the first position when stock S that corresponds to a muntin bar that will be assembled in a muntin bar grid G in a vertical orientation is being punched. The control 60 causes the cylinder 58 to move the punch 56 to move to the second position 28, when stock S corresponds to a muntin bar that will be assembled in a horizontal orientation after being punched.

Referring to FIG. 6, the roll forming machine 52 receives the punched ribbon stock S from the notching device 50 by way of the second accumulator 51. The roll forming machine 52 bends the stock S to form hollow muntin bar stock having a side 24b with the finish 26 and a side 24a with the finish 28. In the illustrated embodiment, the formed muntin bar stock has notches in the woodgrain side 24b corresponding to the cutouts 43 in the stock S and notches 23 in the painted side 24a corresponding to the cutouts 41 in the stock S.

U.S. Pat. No. 6,173,484, entitled "System for Fabricating Muntin Bars From Sheet Material," to McGlinchy discloses the details of one representative roll forming machine 52. FIG. 4 schematically indicates a progressive change in the shape of the stock strip S from a flat strip to a rectangular cross-section structure as the strip passes through multiple stages of the roll forming machine 52. The strip S is bent in the region of the fold lines 36a, 36b, 26c, 36d to form an enclosed structure having rectangular borders as seen from the end. When severed from the end of the strip S by the severing device 54, this structure forms a muntin bar M that is interfitted with one or more other muntin bars to form a grid, such as the grid G of FIGS. 1 and 2.

The severing device 54 severs the muntin bar stock S to form individual notched muntin bars M. A muntin bar conveyor 55 moves the muntin bars to the side after they are cut. Details of the severing device 54 and the muntin bar conveyor 55 are disclosed in U.S. Pat. No. 6,173,484 to McGlinchy.

As can be seen from FIG. 4, the muntin bar M includes an outer surface 24. The outer surface 24 includes an outwardly facing side 24a that would be visible to a person looking through the insulating glass unit 10 from one side of the unit and an outwardly facing side 24b that would be visible to a person looking through the insulating glass unit from the opposite side of the unit 10. In one embodiment of the present invention, an outer surface 24 of the strip S is painted or otherwise treated to have a first appearance and a portion of the outer surface 24, approximately half its width, is covered with the coating layer 30 having a second appearance.

Figure 5:
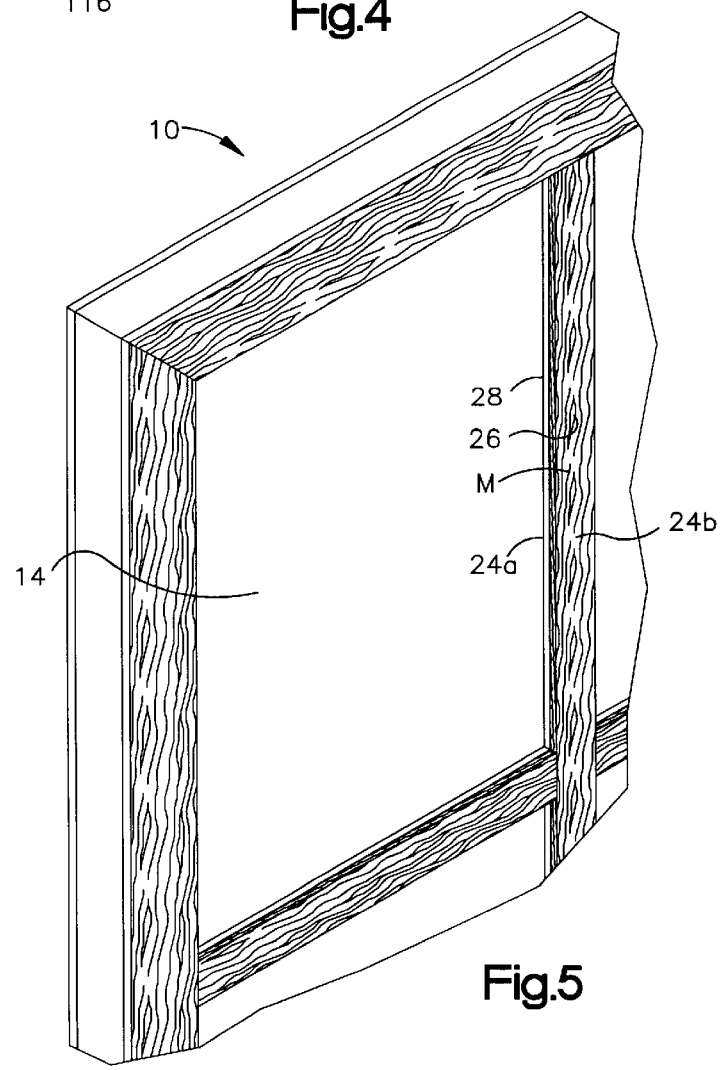
FIG. 5 is an enlarged perspective view of a portion of an insulating glass unit having a notched muntin bar fabricated in accordance with the present invention.

Bending of the strip S as depicted in FIG. 4 produces a two-tone muntin bar M that is, a muntin bar that has a first appearance on an outwardly facing surface 24a, and a second appearance on the outwardly facing surface 24b. The enlarged perspective view shown in FIG. 5 shows an insulating glass unit 10 that includes such a muntin bar grid.

The apparatus 46 is used to make individual muntin bars that can be assembled into a muntin bar grid G having two outwardly facing surfaces 24a, 24b. The supply of thin sheet stock S that has been treated to define first and second finishes 26, 28 on one side of the material. The thin sheet stock is selectively moved through the notching device 50. When the control 60 determines that a provided length of sheet material corresponds to a muntin bar that will be assembled in a first orientation in a muntin bar grid G, such as a horizontal orientation, one or more sections of material having the finish 26 are removed from the material stock S that corresponds to the length of a muntin bar to form cutouts 43. When the control 60 determines that a length of sheet material corresponds to a muntin bar that will be assembled in a second orientation, such as a vertical orientation in a muntin bar grid G, the cylinder 58 is actuated to move the punch 56 to the side. Then one or more sections of material are removed from the portion of the strip having the finish 28 to form cutouts 41. The muntin bar stock S is passed through the rolling mill to form elongated tubular muntin bar stock S having a side 24*a* with the finish 28, and a side 24*b* with the second finish 26. The muntin bar stock S is severed at predetermined locations to form individual muntin bars. The muntin bars that will be assembled in the first orientation have notches 22 in the side 24*b* having the first finish 26. The muntin bars that will be assembled in the second orientation have notches 23 in the side 24*a* having the finish 28.

While the present invention has been described with a degree of particularity, it is the intent that the invention include all modifications and alterations from the disclosed design falling within the spirit or scope of the appended claims.

I claim:

1. A method for making notched muntin bars from a supply of sheet material having first and second finishes, comprising:
    a) providing a supply of thin sheet material that has been treated to define first and second finishes on a side of said sheet material;
    b) removing one or more sections of material having said first finish at specified locations along a length of the sheet material;
    c) removing one or more sections of material having said second finish at specified locations along the length of the sheet material;
    d) passing the sheet material through a rolling mill to form elongated tubular muntin bar stock having a first side of said first finish and a second side of said second finish, said formed muntin bar stock having notches in said first side corresponding to said removed sections of material having said first finish and having notches in said second side corresponding to said removed sections of material having said second finish;
    e) severing the muntin bar stock at predetermined locations along said length to form individual notched muntin bars configured to be combined to form a muntin bar grid having a side of said first finish and a side of said second finish.

2. The method of claim 1 wherein said removed first sections extend inward from a first edge of said sheet material and said removed second sections extend inward from a second edge of said sheet material.

3. The method of claim 1 wherein said first removed sections are rectangular and said second removed sections are rectangular.

4. The method of claim 1 wherein the sheet stock is formed into elongated muntin bar stock having a rectangular cross-section.

5. The method of claim 1 wherein said individual muntin bars severed from the sheet material each have notches that extend across regions having one or the other of said first and second finishes.

6. The method of claim 1 further comprising determining that a muntin bar will be assembled in a first orientation in a muntin bar grid and removing sections of material only having said first finish from a length of said sheet material that corresponds to the individual muntin bar being made.

7. A method for making a muntin bar grid assembly, comprising:
    a) providing a supply of thin sheet material that has been treated to define first and second finishes on a side of said sheet material;
    b) removing one or more sections of material having said first finish at specified locations along a length of the sheet material;
    c) removing one or more sections of material having said second finish at specified locations along the length of the sheet material;
    d) passing the sheet material through a rolling mill to form elongated tubular muntin bar stock having a first side of said first finish and a second side of said second finish, said formed muntin bar stock having notches in said first side corresponding to said removed sections of material having said first finish and having notches in said second side corresponding to said removed sections of material having said second finish;
    e) severing the muntin bar stock at predetermined locations along said length to form individual notched muntin bars; and
    f) aligning at least one muntin bar notch with a notch in at least one other muntin bar and bringing said one and said other muntin bar into contact to form a muntin bar grid having a first side of said first finish and a second side of said second finish.

8. The method of claim 7 wherein the formed muntin bars each have notches only in one side having either said first finish or said second finish.

9. The method of claim 7 further comprising determining that a muntin bar will be assembled in a first orientation in a muntin bar grid and removing sections of material only having said first finish from a length of said sheet material that corresponds to the individual muntin bar being made.

10. The method of claim 7 wherein said removed first section extends inward from a first edge of said sheet material and said removed second section extends inward from a second edge of said sheet material.

11. The method of claim 7 wherein said first removed sections are rectangular and said second removed sections are rectangular.

12. The method of claim 7 wherein the sheet stock is formed into elongated muntin bar stock having a rectangular cross-section.

13. A method for making a muntin bar grid, comprising:
    a) providing a supply of thin sheet material that has been treated to define first and second finishes on a side of said sheet material;
    b) determining that a provided length of sheet material corresponds to a muntin bar that will be assembled in a first orientation in a muntin bar grid;
    c) removing one or more sections of material having said first finish along a length of the sheet material that corresponds to the length of the muntin bar that will be assembled in said first orientation;
    d) determining that a provided length of sheet material corresponds to a muntin bar that will be assembled in a second orientation in a muntin bar grid;

e) removing one or more sections of material having said second finish along a length of the sheet material that corresponds to the length of the muntin bar that will be assembled in said second orientation;

f) passing the sheet material through a rolling mill to form elongated tubular muntin bar stock having a first side of said first finish and a second side of said second finish, said formed muntin bar stock having notches in said first side corresponding to said removed sections of material having said first finish and having notches in said second side corresponding to said removed sections of material having said second finish;

g) severing the muntin bar stock at predetermined locations to form individual muntin bars that will be assembled in a first orientation having notches in said first side and individual muntin bars that will be assembled in a second orientation having notches in said second side.

14. An apparatus for making notched muntin bars, comprising;
    a) an uncoiler for a supply of ribbon stock having a surface defining a first region of a first finish and a second region of a second finish;
    b) a notching device for receiving ribbon stock from the supply, said notching device having a punch that is movable between a first position where the punch is engageable with said first region to remove first sections of material from said first region and a second position where the punch is engageable with said second region to remove second sections of material from said second region;
    c) a roll forming machine adapted to receive ribbon stock from the notching device and form hollow muntin bar stock having a first side of said first finish and a second side of said second finish, said formed muntin bar stock having notches in said first side corresponding to said first sections and having notches in said second side corresponding to said second sections; and
    d) a severing device for severing the muntin bar stock to form individual notched muntin bars having first and second finishes.

15. The apparatus of claim 14 further comprising a control coupled to said punch causing said punch to said first position when stock corresponding to a muntin bar to be assembled in a muntin bar grid in a first orientation is being punched and to move said punch to said second position when stock corresponding to a muntin bar to be assembled in a muntin bar grid in a second orientation is being punched.

16. An apparatus for making notched muntin bars, comprising;
    a) an uncoiler for a supply of ribbon stock having a surface defining a first region of a first finish and a second region of a second finish;
    b) a punch for receiving ribbon stock from the supply, said punch is movable between a first position where the punch is engageable with said first region to remove first sections of material from said first region and a second position where the punch is engageable with said second region to remove second sections of material from said second region;
    c) a pneumatic cylinder connected to said punch for moving said punch between said first and second positions;
    d) a control coupled to said cylinder causing said cylinder to move said punch to said first position when stock corresponding to a muntin bar to be assembled in a muntin bar grid in a first orientation is being punched and to move said punch to said second position when stock corresponding to a muntin bar to be assembled in a muntin bar grid in a second orientation is being punched;
    e) a roll forming machine adapted to receive ribbon stock from the notching device and form hollow muntin bar stock having a first side of said first finish and a second side of said second finish, said formed muntin bar stock having notches in said first side corresponding to said first sections and having notches in said second side corresponding to said second sections; and
    f) a severing device for severing the muntin bar stock to form individual notched muntin bars.

17. A method for making notched muntin bars from a supply of sheet material having first and second finishes, comprising:
    a) providing a supply of thin sheet material that has been treated to define first and second finishes on a side of said sheet material;
    b) removing one or more sections of material having said first finish at specified locations along a length of the sheet material;
    c) passing the sheet material through a rolling mill to form elongated tubular muntin bar stock having a first side of said first finish and a second side of said second finish, said formed muntin bar stock having notches in said first side corresponding to said removed sections of material having said first finish;
    e) severing the muntin bar stock at predetermined locations along said length to form individual notched muntin bars.

18. A method for making a muntin bar grid assembly, comprising:
    a) providing a supply of thin sheet material that has been treated to define first and second finishes on a side of said sheet material;
    b) removing one or more sections of material having said first finish at specified locations along a length of the sheet material;
    c) passing the sheet material through a rolling mill to form elongated tubular muntin bar stock having a first side of said first finish and a second side of said second finish, said formed muntin bar stock having notches in said first side corresponding to said removed sections of material having said first finish;
    d) severing the muntin bar stock at predetermined locations along said length to form individual notched muntin bars and individual unnotched muntin bars; and
    e) aligning at least one notch of a notched muntin bar notch over an unnotched muntin bar and bringing said notched muntin bar and said unnotched muntin bar into contact to form a muntin bar grid having a first side of said first finish and a second side of said second finish.

19. The method of claim 18 further comprising disabling a notching device to skip sections of said sheet material to form said unnotched muntin bars.

20. An apparatus for making notched muntin bars, comprising;
    a) a supply of ribbon stock having a surface defining a first region of a first finish and a second region of a second finish;
    b) an uncoiler for supporting said supply of ribbon stock;
    c) a notching device for receiving ribbon stock from the supply, said notching device having a punch in a first position where the punch is engageable with said first region to remove sections of material from said first region;

d) a roll forming machine adapted to receive ribbon stock from the notching device and form hollow muntin bar stock having a first side of said first finish and a second side of said second finish, said formed muntin bar stock having notches in said first side corresponding to said first sections; and e) a severing device for severing the muntin bar stock to form individual notched muntin bars having first and second finishes.

* * * * *